Patented Apr. 18, 1950

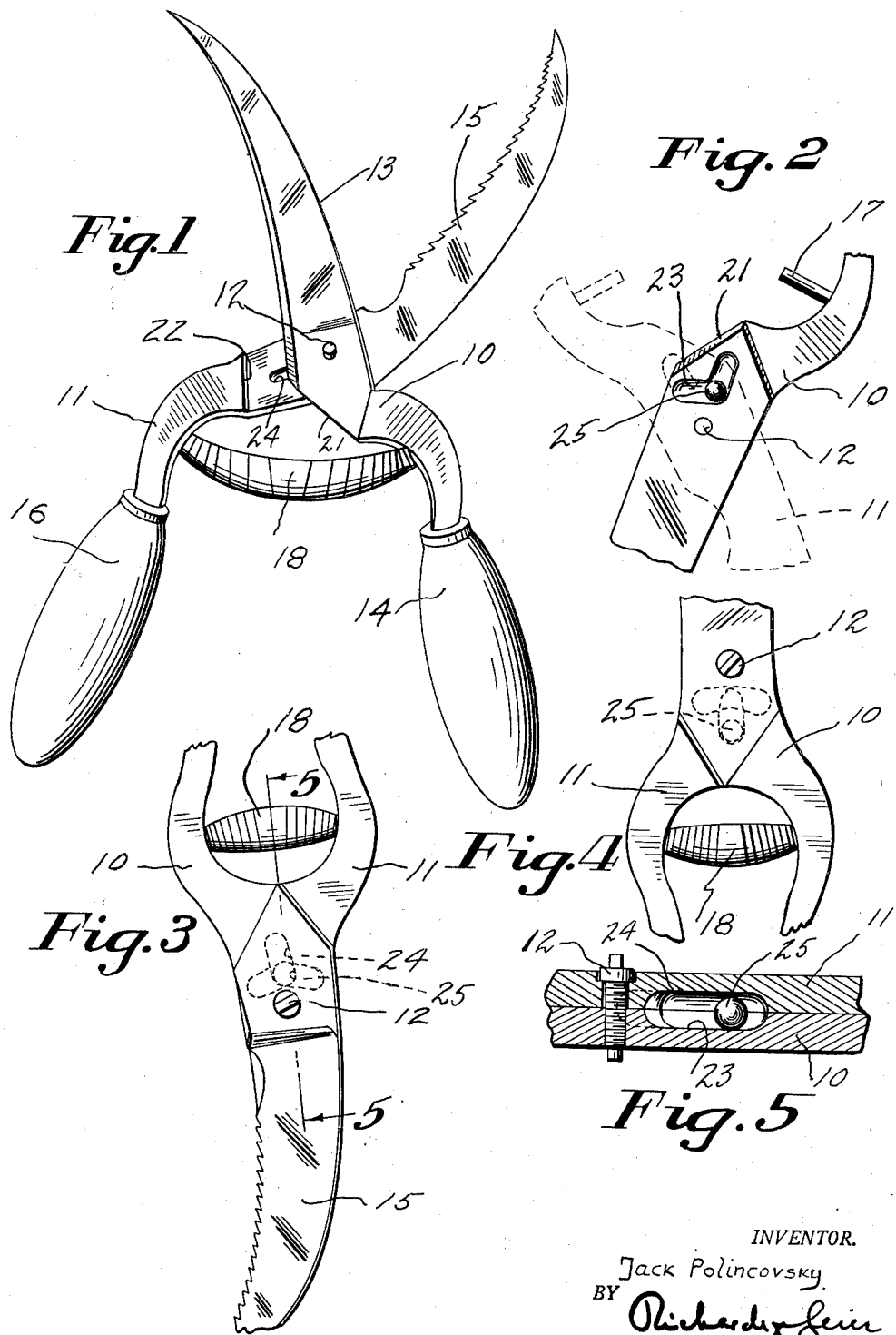

2,504,447

UNITED STATES PATENT OFFICE 2,504,447

SHEARS

Jack Polincovsky, New York, N. Y., assignor to Latama Cutlery, Inc., New York, N. Y.

Application February 3, 1949, Serial No. 74,315

4 Claims. (Cl. 30—262)

This invention relates to manually operable shears.

It is an object of the present invention to provide in a pair of shears a self-locking element which can be moved by gravity into a position to release the shear elements for operation as when the shears are extended with their points down or when the shears are brought upright and the shear elements brought to a closed position, the locking element can pass by gravity to a position between and within the shear elements to effect locking together of the elements.

Other objects of the present invention are to provide a pair of shears with a self-locking arrangement which is of simple construction, inexpensive to manufacture, can be built in to the shearing elements, requires only one additional part upon the shears and efficient in operation.

For other objects and for a better understanding of the invention, reference may be had to the following detailed description taken in connection with the accompanying drawing, in which Fig. 1 is a plan view of the shears with the locking element released to permit the shears to be open and operated.

Fig. 2 is a fragmentary plan view of one of the shear elements or legs and looking into the slot of one of the elements and upon the locking ball therein.

Fig. 3 is a plan view of the shears with the legs closed upon one another with the locking ball lowered by gravity into position to permit the shear elements to be released for operation.

Fig. 4 is a plan view with the shear elements closed upon one another and extending upwardly so that the locking element is in a position to retain the shear elements together.

Fig. 5 is a fragmentary and longitudinal sectional view taken on line 5—5 of Fig. 3.

Referring now to the figures, 10 and 11 represent respectively shearing elements which are pivotally connected together by a pivot pin 12 extending through one of the elements and threaded into the other element. The shearing element 10 has a cutting edge 13 and a handle 14. The shearing element 11 has a jagged cutting edge 15 and a handle portion 16.

Each of the shearing elements is provided with an inwardly extending pin 17 onto which is extended one end of a telescopic compression spring 18. This spring tends to return the shearing elements to their open positions after the cutting edges have been brought together by the operation of the handles 14 and 16.

The shearing elements are brought to a stop when closed upon one another by the engagement of an edge 21 of the element 10 with a raised shoulder 22 of the element 11.

In order to provide for the locking of the elements when in their closed position, there is provided in each of the opposing and cooperating faces of the respective elements a dog leg recess. In the shearing element 10 there is provided a dog leg recess 23 extending in one direction, while in the element 11, there is provided a dog leg recess 24 extending in the opposite direction. Each recess has a portion extending longitudinally of the shear elements and another connecting portion extending transversely of the shearing element. Within the portions of the recesses of the respective elements which are aligned with one another, may travel a ball locking element 25.

If the shears are held with the cutting edges up and with the shearing elements brought to their closed position, the ball 25 will drop into the aligned longitudinally extending portions of the recesses so as to lock the elements against opening movement. The spring 18 will have been compressed and will supply sufficient force to frictionally retain the ball in the longitudinally extending portions of the recesses and against displacement. The ball will thus lie in the position as shown clearly in Fig. 4.

With the shears extended with the cutting edges down, as shown in Fig. 3, and with the handle portions brought slightly together, the ball 25 will be released so that it can drop down into alignment with the transverse portions of the recesses whereby the transverse portions can slide over one another and the ball will lie in a position so as not to interfere with their movement. As long as the shears are extended down and as long as they are not brought close together with the cutting edges in their closed positions and at the same time not extended so that the points are up, free action of the shearing elements can be effected. The shearing elements will only be locked when the same are closed upon one another and the points extended up so as to permit the ball to drop by gravity into the aligned longitudinal portions of the recesses.

It should now be apparent that there has been provided a self-locking pair of shears which, by a simple flip of the shears to a position where the points extend down and a squeeze upon the handles, the lock elements can be released or by bringing the points to a raised position and the handles together, the locking ball can be dropped to a locking position and the elements held together.

While various changes may be made in the detail construction, it shall be understood that such changes shall be within the spirit and scope of the present invention as defined in the appended claims.

What is claimed is:

1. In an article of the class described, a pair of elements having handle portions and face portions cooperating with one another, said elements being pivotally connected together, the face portions of the respective elements having respectively reversely extending recesses, each of said recesses having a longitudinal portion and a transversely extending portion, a locking element lying in the recesses and adapted to pass by gravity into the longitudinally extending portions of the slots into and out of alignment with the transverse portions of the recesses to free the elements for operation or to lock the same together.

2. In an article of the class described, a pair of elements having handle portions and face portions cooperating with one another, said elements being pivotally connected together, the face portions of the respective elements having respectively reversely extending recesses, each of said recesses having a longitudinal portion and a transversely extending portion, a locking element lying in the recesses and adapted to pass by gravity into the longitudinally extending portions of the slots into and out of alignment with the transverse portions of the recesses to free the elements for operation or to lock the same together, and the respective handle portions being separated from one another, a compression spring extending between the handle portions and each of the handle portions having means for receiving the ends of said spring, said spring serving, when the ball lies within the longitudinally extending portions of the recesses, to lock the elements against angular displacement relative to one another.

3. In a pair of shears, shearing elements having respectively cutting edges and handle portions, a pivot pin connecting the shearing elements together for pivotal movement with respect to one another, said shearing elements having respectively cooperating surface portions lying about the pivot pin, said surface portions having respectively dog leg recesses, one recess having a longitudinally extending portion and a transverse portion extending in one direction, the other recess having a longitudinally extending portion and a transversely extending portion extending in the opposite direction from the transversely extending portion of the one recess, a locking ball lying in the longitudinally extending portions of the recesses and adapted to be moved by gravity into the upper ends of the same or downwardly into the lower ends to permit the alignment of the transversely extending portions of the recess whereby to permit free opening movement of the shearing elements, said ball, serving when lying in the longitudinally extending portions of the recesses out of alignment with the transverse portions of the recesses to lock the shearing elements against angular displacement with respect to each other.

4. In a pair of shears, shearing elements having respectively cutting edges and handle portions, a pivot pin connecting the shearing elements together for pivotal movement with respect to one another, said shearing elements having respectively cooperating surface portions lying about the pivot pin, said surface portions having respectively dog leg recesses, one recess having a longitudinally extending portion and a transverse portion extending in one direction, the other recess having a longitudinally extending portion and a transversely extending portion extending in the opposite direction from the transversely extending portion of the one recess, a locking ball lying in the longitudinally extending portions of the recesses and adapted to be moved by gravity into the upper ends of the same or downwardly into the lower ends to permit the alignment of the transversely extending portions of the recess whereby to permit free opening movement of the shearing elements, said ball, serving when lying in the longitudinally extending portions of the recesses out of alignment with the transverse portions of the recesses to lock the shearing elements against angular displacement with respect to each other, and the handle portions of the respective elements having respectively opposing inwardly extending projections, a telescopic compression spring extending between the handle portions and its ends fitted respectively over the opposing projections thereon.

JACK POLINCOVSKY.

No references cited.